Jan. 14, 1936.    C. J. WINKLER    2,027,505
BEARING SEAL FOR ROTARY SHAFTS
Filed Oct. 29, 1934    2 Sheets-Sheet 1
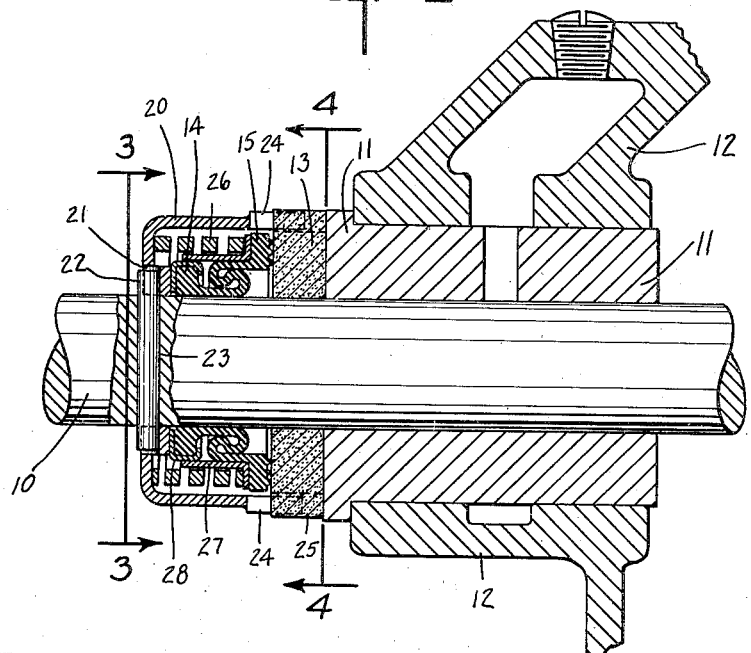
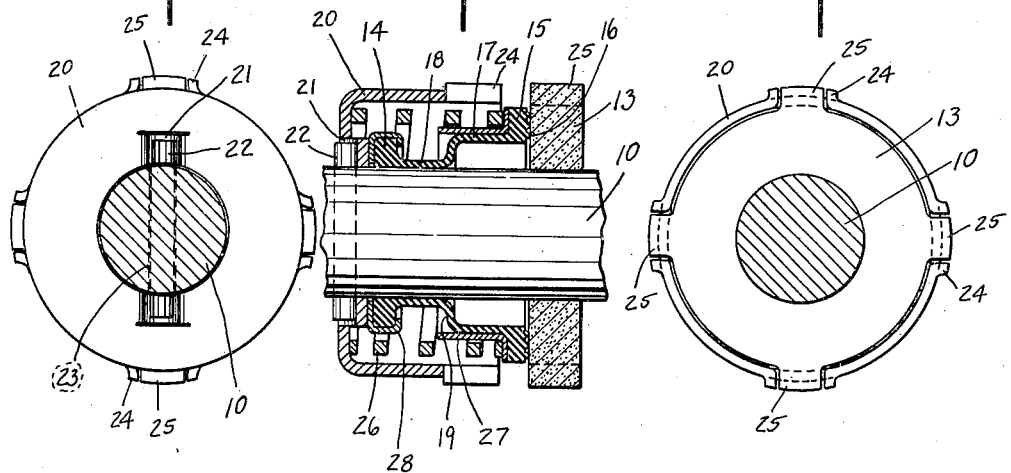
INVENTOR.
CARL J. WINKLER.
BY Lockwood Goldsmith & Galt
ATTORNEYS.

Jan. 14, 1936.                    C. J. WINKLER                    2,027,505
                        BEARING SEAL FOR ROTARY SHAFTS
                           Filed Oct. 29, 1934            2 Sheets-Sheet 2
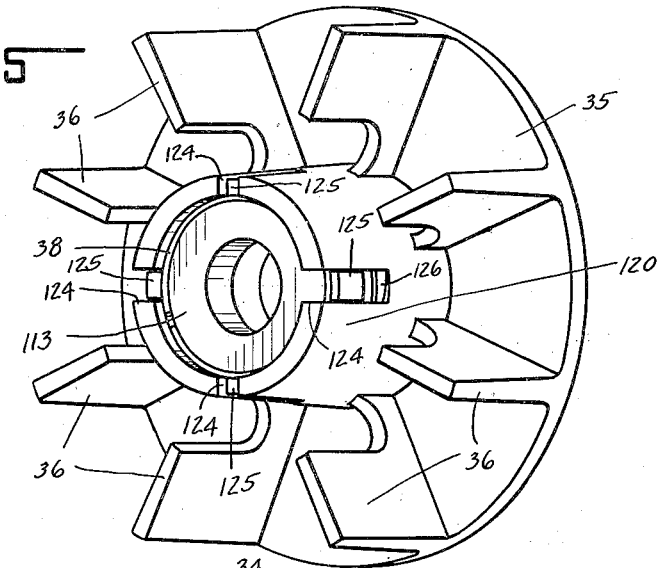
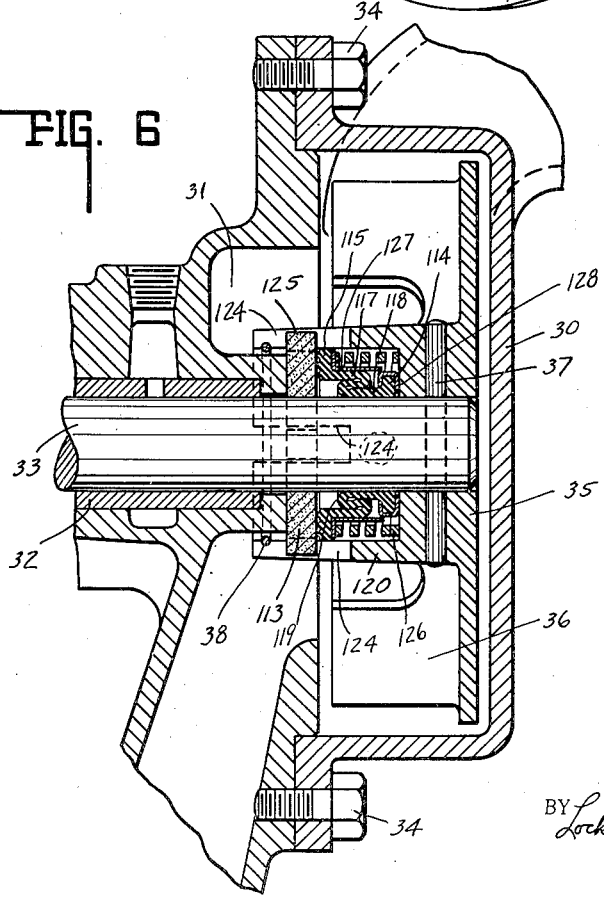
INVENTOR.
CARL J. WINKLER.
BY Lockwood Goldsmith & Galt
ATTORNEYS.

Patented Jan. 14, 1936

2,027,505

UNITED STATES PATENT OFFICE 2,027,505

BEARING SEAL FOR ROTARY SHAFTS

Carl J. Winkler, Indianapolis, Ind., assignor to Schwitzer-Cummins Company, Indianapolis, Ind., a corporation Application October 29, 1934, Serial No. 750,398

3 Claims. (Cl. 286—11)

This invention relates to an improvement in seals, particularly seals for fluid pumps, such as the water pump of an internal combustion engine. As applied to a rotary shaft, it is adapted to eliminate or minimize leakage from the fluid chamber between the drive shaft and its bearing.

One feature of the invention resides in the employment of a flexible sealing member, which may be preferably formed of rubber or the like, which will flex into sealing relation with the surface of the shaft while freely permitting relative longitudinal movement or end play between the shaft and bearing, as well as to compensate for wear in the sealing washer. Thus, the seal herein disclosed may freely move with the shaft as distinguished from sliding thereon and failing to function as a result of sticking due to tightness, corrosion or roughness of the shaft.

Another feature of the invention resides in the mounting of such a seal within a recessed portion or cup provided for the purpose and formed or cast in the hub of an impeller for water pumps, and wherein the seal and impeller are positioned in the pump chamber. By means of this arrangement water and sediment is prevented from entering the seal and affecting the yielding sealing member therein.

Another feature of the invention resides in the unitary relation of the impeller and seal whereby they may be assembled together and furnished as a unit for replacement. By thus assembling them for replacement, they may be more readily mounted in place on the pump shaft by the mechanic and the seal is thereby more perfectly fitted in place. This arrangement eliminates the necessity of the mechanic assembling the various parts of the seal independently of the impeller when making installation.

Another feature of the invention resides in the use of a carbon washer which is novel and more efficient and lasting than the usual washers commonly employed, such as cork, treated fabric, bronze or similar material. Washers of the latter materials would not readily slide on the shaft should the surface thereof become corroded. They also require lubrication and their sealing surfaces would become defective upon being scratched or torn by particles of grit. This difficulty is avoided in the use of a carbon washer which has the properties of not requiring lubrication, comprises a smooth sealing surface, and is readily slidable over the surfaces of a corroded shaft without sticking. Thus, in tests applied to all such materials, a carbon washer is found to be outstanding in these several advantages over the others.

The full nature of the invention will be understood from the accompanying drawings and the following description and claims:

Fig. 1 is a central vertical section through the bearing and seal with the shaft shown in elevation. Fig. 2 is a central vertical section through the seal in expanded non-sealing position. Fig. 3 is a section taken on the line 3—3 of Fig. 1. Fig. 4 is a section taken on the line 4—4 of Fig. 1. Fig. 5 is a perspective view of a unitary impeller with the seal mounted therein. Fig. 6 is a central vertical section through a portion of a pump housing showing the impeller and sealing ring mounting.

In the drawings there is shown a drive shaft 10 rotatably mounted in a bearing 11 supported in a housing 12 of a water pump or similar fluid-containing device. The liquid seal, forming the feature of this invention, is secured to the shaft 10 to bear against the outer end of the bearing 11 externally of the housing 12 for preventing fluid contained therein from leaking between the bearing 11 and shaft 10 during the rotation of the latter.

The seal comprises a carbon washer 13 which closely surrounds the shaft 10, rotating therewith and providing a sealing as well as a bearing surface against the outer end of the bearing 11. Also mounted about the shaft there is a flexible seal which may preferably be formed of rubber having a thick semirigid ring 14 at one end and a similar ring 15 at the other end provided with the annular ribs 16 bearing directly against one face of the washer 13. Intermediate the rings 14 and 15 there is a thin flexible outer neck portion 17 connected with an inner neck portion 18 by a flexible shoulder 19. As indicated in Fig. 1, the shoulder 19 is adapted to flex to permit the outer portion 17 to overlap the inner portion 18 when the seal is secured in operative position.

A metal housing or cup 20 is provided to house the seal, which cup has a recess 21 for receiving a pin 22 extending through an opening in the shaft 10, as indicated by the dotted lines 23. The inner or open end of the cup 20 is provided with diametrically disposed outwardly projecting flanges 24 embracing longitudinal slots for receiving the projections 25 formed about the periphery of the washer 13 and extending radially therefrom. Thus, the cup 20 is keyed to the shaft 10 by the pin 22 and to the washer 13 by the projections 25.

Contained within the cup 20 there is a compression spring 26 having one end bearing against the closed end of the cup and the other end bearing against the ring 15 of the flexible seal through the medium of a metal spring guide or sleeve 27. The ring 14 of the seal is protected by a metal clamp ring 28.

In assembly, but before securing the seal to the shaft, the parts are as illustrated in Fig. 2, with the spring and flexible seal expanded and the slots formed by the flanges 24 in the cup out of engagement with the projections 25 of the washer. In such position the cup is forced inwardly to compress the spring 26 and collapse the flexible seal, as illustrated in Fig. 1, whereupon the pin 22 is inserted through the opening of the shaft so that its ends will lie within the recessed portion 21 of the cup. In this operative position, the entire seal will rotate with the shaft relative to the bearing. The spring 26 will hold the adjacent surfaces of the washer and bearing in sealing engagement while rotating relative to each other, and will also maintain constant sealing pressure between the ring 25 of the flexible seal and the corresponding surface of the washer 13. In its compressed operative position the flexible seal is caused to double up on itself, as shown in Fig. 1, so that the inner portion 18 will be compressed in sealing relation against the periphery of the shaft by the shoulder portion 19. The shoulder portion 19 permits variation in length of the seal while still maintaining the sealing relation of the inner portion 18, as well as the ring portion 15. Such variation, as above stated, may be caused by variation in thickness of the parts and wear, as well as longitudinal displacement of the shaft due to end thrust forces, bearing clearance and the like.

While the invention has been herein disclosed as being applicable to a water pump shaft, it will be clear that the same principle in varying forms may be equally well utilized in different structures and under different conditions for functioning in the same manner and serving the same purpose.

Referring to the unitary structure and seal illustrated in Figs. 5 and 6, the pump housing 30 embraces a pump chamber 31, said housing having a bearing 32 through which the shaft 33 extends. The end of the pump housing is removable from the main portion thereof through the medium of the bolts 34.

As illustrated in Fig. 6, there is a unitary structure comprising the impeller 35 having blades 36 which is adapted to be pinned to the shaft 33 upon assembly by means of the pin 37. The impeller is provided with an elongated cup-like housing 120 for receiving the seal. The open end of the housing 120 overlaps and embraces the adjacent end of the bearing 32 against which the carbon sealing washer 113 abuts. Said washer is provided with projections 125 which extend through the radially disposed longitudinal slots 124 formed in the housing 120. To maintain the sealing unit in place before assembly with the shaft, there is a locking ring 38.

The seal comprises similar parts and functions in the same manner as the above-described in respect to Figs. 1 to 4, inclusive, wherein there is provided a flexible member such as rubber or synthetic rubber or any other similar flexible material, having the semi-rigid ring 114 at one end and a similar ring 115 at the other end provided with the annular ribs bearing directly against the face of the washer 113, and including the outer and inner neck portions 117 and 118 respectively and the flexible shoulder 119. It also embodies the said compression spring 126, spring guide or sleeve 127 and clamp ring 128.

In practice, the seal is assembled within the impeller and locked therein by the locking ring 38, as illustrated in Fig. 5, at the source of manufacture. This unit may be furnished as a replacement part, whereupon the mechanic, in assembling it in the pump, need only remove the bolts 34 in the outer housing, slip the pump with the seal in place over the end of the shaft 33 and insert the pin 37 therein. While it has herein been illustrated as being locked by the pin 37, the impeller may be secured upon the shaft in any other manner desirable.

A further advantage of this arrangement of the seal as a unitary part of the impeller and within the pump chamber 31, is that it eliminates any danger of rusty particles or grit carried by the water from entering the seal and affecting the flexible parts thereof. To this extent it differs from the structure illustrated in Figs. 1 to 4, inclusive, wherein it is possible for water or moisture to enter the seal between the shaft 10 and the surface of the washer 13. It is to be noted, however, that in the structures of Figs. 5 and 6 this cannot occur since at one end there is a seal between the washer 113 and the end of the bearing 32, while at the other end there is a definite seal between the flexible member and the shaft.

The invention claimed is:

1. In a fluid seal, the combination with shaft and housing members rotatable relative to each other, of a sealing washer mounted about said shaft to bear against the ends of the housing member, a cup-shaped metal closure having one end keyed to one of said rotatable members, a rubber sealing member mounted in said closure having oppositely-disposed ring portions, intermediate reduced and enlarged portions with a collapsible shoulder portion therebetween, said reduced portion bearing upon the periphery of the shaft in sealing engagement therewith, the ring of the enlarged portion bearing against the washer in sealing engagement and the collapsible shoulder portion being reversed upon itself when in operating position to permit longitudinal displacement while maintaining the reduced sealing portion in compressed engagement with the shaft, and a compressible spring surrounding said member interposed between the end of the closure and the enlarged sealing ring for exerting pressure thereon to maintain said flexible member and washer and said washer and housing member in sealing engagement.

2. In a fluid seal, the combination with a shaft and housing members rotatable relative to each other, of a sealing washer mounted about said shaft to bear against the end of the housing member, a cup-shaped metal closure having a closed end keyed to one of said rotatable members, a tubular rubber sealing sleeve mounted in said housing having oppositely-disposed ring portions and an intermediate reduced portion with a flexible shoulder, said reduced portion bearing upon the periphery of the shaft throughout a substantial portion of its length in sealing engagement therewith, one of said ring portions bearing against the washer in sealing engagement and the shoulder portion being reversible upon itself to permit of longitudinal displacement while maintaining the reduced sealing portion in compressed engagement with the shaft, and a compressible spring surrounding said sleeve interposed between the closed end of the closure and the sealing washer for exerting pressure thereon to maintain said sleeve and washer and said washer and housing member in sealing engagement.

3. In a fluid seal, the combination with a shaft and housing members rotatable relative to each other, of a sealing washer mounted about said shaft to bear against the end of the housing member, and a tubular rubber sealing sleeve mounted about said shaft, said sleeve having oppositely-disposed ring portions and an intermediate reduced portion joined to one of said ring portions by a flexible shoulder, said reduced portion extending in sealing engagement with the shaft throughout a substantial portion of its length, and the ring portion on said flexible shoulder fixedly bearing against said sealing washer and movable therewith longitudinally of the shaft through the flexibility of said shoulder.

CARL J. WINKLER.